(12) United States Patent
Lessmüller et al.

(10) Patent No.: US 9,816,808 B2
(45) Date of Patent: Nov. 14, 2017

(54) MEASURING DEVICE FOR ACQUIRING SURFACE DATA AND/OR INTERFACES OF A WORKPIECE TO BE PROCESSED BY A LASER PROCESSING DEVICE

(71) Applicant: Lessmüller Lasertechnik GmbH, München (DE)

(72) Inventors: Eckhard Lessmüller, München (DE); Christian Truckenbrodt, München (DE)

(73) Assignee: LESSMÜLLER LASERTECHNIK GMBH, München (DE)

( * ) Notice: Subject to any disclaimer, the term of this patent is extended or adjusted under 35 U.S.C. 154(b) by 148 days.

(21) Appl. No.: 14/720,175

(22) Filed: May 22, 2015

(65) Prior Publication Data

US 2015/0338210 A1    Nov. 26, 2015

(30) Foreign Application Priority Data

May 26, 2014    (DE) .......................... 10 2014 007 887

(51) Int. Cl.
| | |
|---|---|
| *G01B 11/24* | (2006.01) |
| *H01S 3/0933* | (2006.01) |
| *G01B 9/02* | (2006.01) |
| *H01S 3/067* | (2006.01) |
| *B23K 26/03* | (2006.01) |

(52) U.S. Cl.
CPC ........ *G01B 11/2441* (2013.01); *B23K 26/032* (2013.01); *G01B 9/02044* (2013.01); *G01B 9/02091* (2013.01); *H01S 3/06704* (2013.01); *H01S 3/0933* (2013.01); *G01B 2290/35* (2013.01)

(58) Field of Classification Search
None
See application file for complete search history.

(56) References Cited

U.S. PATENT DOCUMENTS

| | | | | |
|---|---|---|---|---|
| 3,864,044 A | * | 2/1975 | Lyshkow | ............. G01N 21/534 250/573 |
| 2010/0228119 A1 | * | 9/2010 | Brennan | ............. A61B 5/0066 600/424 |
| 2012/0138586 A1 | * | 6/2012 | Webster | ................ A61B 18/20 219/121.64 |
| 2012/0285936 A1 | | 11/2012 | Urashima et al. | |

(Continued)

FOREIGN PATENT DOCUMENTS

| | | |
|---|---|---|
| DE | 101 55 203 A1 | 6/2003 |
| EP | 1 977 850 B1 | 4/2013 |

*Primary Examiner* — Shawn Decenzo
(74) *Attorney, Agent, or Firm* — Arent Fox LLP

(57) ABSTRACT

The invention relates to a measuring device for acquiring surface data and/or interfaces of a workpiece to be processed by a laser processing device. The laser processing device comprises a laser source and a processing head which is configured to provide at least one high-energy processing beam, in particular a laser beam. The laser source and the processing head are interconnected by an optical fiber and the measuring device comprises a scanning device configured as an optical coherence tomograph for surface scanning and/or interface scanning of the workpiece. The optical fiber which interconnects the laser source and the processing head forms a component of the scanning device.

17 Claims, 2 Drawing Sheets

(56) References Cited

U.S. PATENT DOCUMENTS

Figure 1:
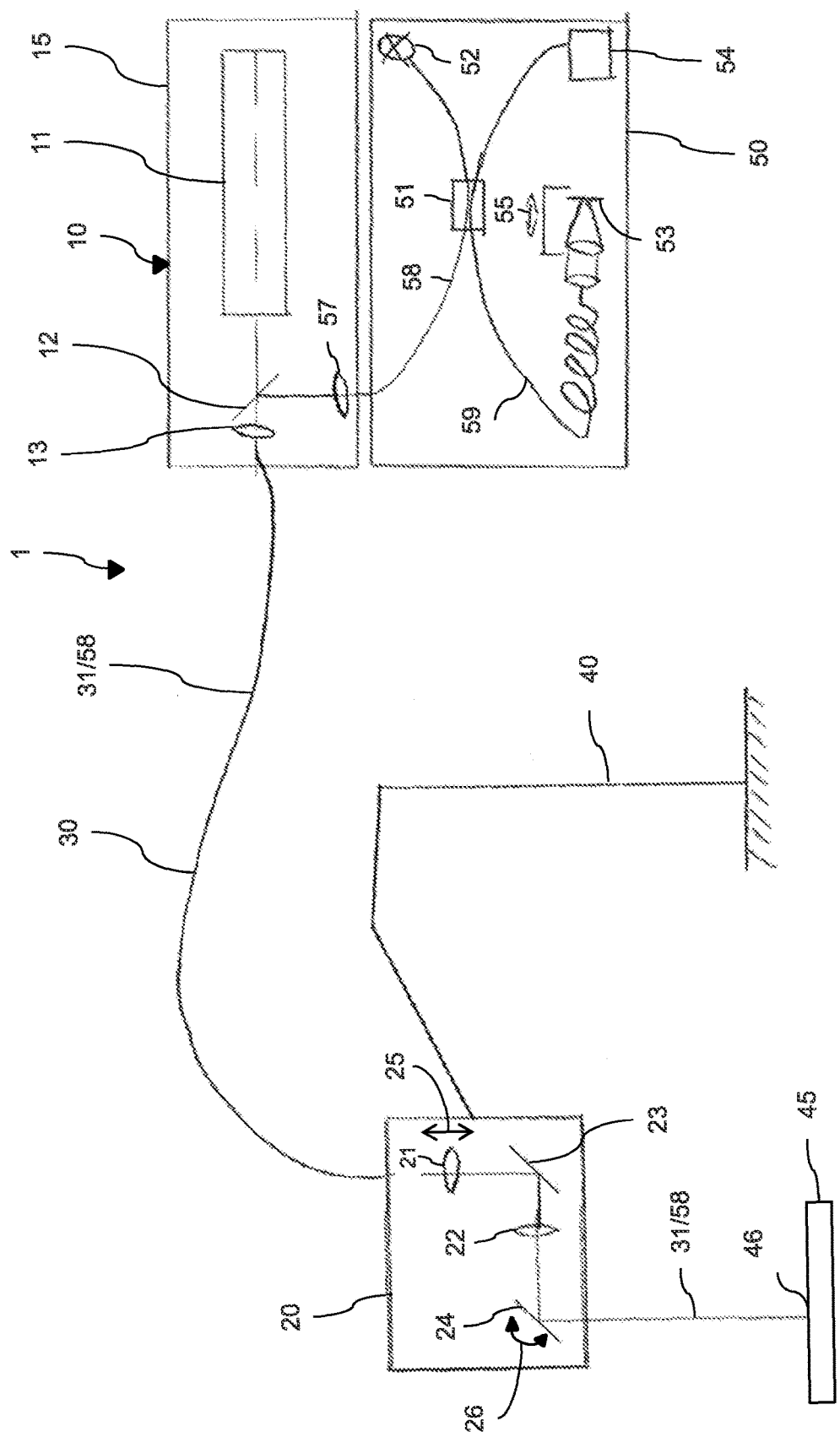

2016/0039045 A1* 2/2016 Webster ............... B23K 26/032
  356/496
2016/0059347 A1* 3/2016 Kogel-Hollacher ... B23K 26/03
  219/121.74

* cited by examiner

MEASURING DEVICE FOR ACQUIRING SURFACE DATA AND/OR INTERFACES OF A WORKPIECE TO BE PROCESSED BY A LASER PROCESSING DEVICE

CROSS-REFERENCE TO RELATED APPLICATION

This application is based upon and claims the benefit of priortiy of the German Patent Application No. 10 2012 007 887.6, filed May 26, 2014. The disclosure of the prior application is hereby incorporated by reference herein its entirety.

The invention relates to a measuring device for acquiring surface data and/or interfaces of a workpiece to be processed by a laser processing device. The laser processing device comprises a laser source and a processing head which is configured to provide at least one high-energy processing beam, in particular a laser beam. The laser source and the processing head are interconnected by an optical fibre. The measuring device comprises a scanning device configured as an optical coherence tomograph (Optical Coherence Tomography, OCT) for surface scanning and/or interface scanning of the workpiece.

Laser processing devices for the processing of workpieces having at least partially light-absorbing surfaces comprising at least one processing head which is configured to provide a high-energy processing beam and which is assigned a scanning device configured as an optical coherence tomograph are known from DE 101 55 203 A1 and EP 1 977 850 B. Such laser processing devices enable a relative movement between one or more workpieces to be processed and the processing head in order to enable a removing and/or joining material processing. The processing head is fitted with an integrated or separately designed source for the high-energy processing beam, for example a laser beam. Typical areas of application for such a processing device are the removal of material from a workpiece or the welding of plastic or metal parts by means of a laser beam. Depending on the application, quality requirements are imposed on such processing processes which inter alia require an exact guidance of the high-energy processing beam with respect to the workpiece as well as a monitoring of the processing result on the workpiece. For this purpose such processing devices are provided with one or more sensor devices which enable an examination of the processing result required for quality control using optical and/or electrical and/or acoustic measuring methods.

Sensors for the application of the aforesaid measuring methods can be influenced by the high-energy processing beam and/or require a mechanical contact to the processed surface. Frequently a lateral minimum distance must be maintained between the processing site of the processing beam and the measurement point at which the respective measuring method is applied. A process regulation for the processing beam can only take place with a time delay. The time delay is obtained from the processing speed and the lateral distance between processing site and measuring site.

The laser processing device known from the aforesaid DE 101 55 203 A1 contains a measuring system for acquiring 3D surface data which can be configured as a white light interferometer, short coherence lidar or as a confocal measuring device. The optical structure of the measuring system is mounted directly on the processing optics of the laser processing device and is coupled in with the aid of a beam splitter mirror coaxially to the processing jet. The laser processing device enables the penetration depth of the processing laser into a workpiece to be measured and optionally actively adjusted.

The further aforesaid EP 1 977 850 B1 discloses a processing device in which the processing head is assigned a scanning device configured as an optical coherence tomograph. The scanning device is integrated in the processing head in such a manner that at least one optical component can be used together by the processing beam and the measuring beam. The jointly used optical components comprise a lens or a protective glass. The lens is provided for focusing the processing beam and the measuring light beam onto the workpiece surface. The known laser processing device additionally has a movably suspended mirror which can be controlled by a control device, which is provided for deflection of the measuring beam and the reflection beams and which can be pivoted in one or more spatial directions in order to bring about a one- or two-dimensional relative movement of the measuring beam with respect to the surface of the workpiece, thereby enabling a linear or surface scanning of the surface of the workpiece.

The mounting of a scanning device on the laser processing head, as described in both the known documents, yields various disadvantages. On the one hand, the external interfering contour of the processing head is enlarged. This can, if the processing head is disposed for example on a guide machine such as, for example, a buckling arm robot, a portal system or the like, result in collisions with clamping tools or other components of the laser processing device. In particular in existing laser processing devices a retrofitting with a measuring device of the type described above is thereby rendered difficult.

In addition, the processing devices are moved rapidly and frequently by the guide machine such as for example buckling arm robots or portal systems. The mounting of the measuring system directly on the processing head therefore requires optical components having a high mechanical strength and stability. Data lines or optical fibres for the measuring system must also permanently withstand these movements.

Another disadvantage is that the measuring system must be constructed to be protected from environmental influences such as, for example dirt during a welding process since the components of the measuring system are arranged close to the processing position of the workpiece.

It is the object of the invention to provide a measuring system for acquiring surface data and/or interface data of a workpiece to be processed by a laser processing device which can be integrated simply, optionally also retrospectively, into the laser processing device.

This object is solved by a measuring device according to the features of patent claim 1 and a laser processing device according to the features of patent claim 12. Advantageous embodiments are obtained from the dependent patent claims.

According to the invention, a measuring device for acquiring surface data and/or interfaces of a workpiece to be processed by a laser processing device is proposed, wherein the laser processing device comprises a laser source and a processing head which is configured to provide at least one high-energy processing beam, in particular a laser beam, and wherein the laser source and the processing head are interconnected by an optical fibre. The measuring device comprises a scanning device configured as an optical coherence tomograph for surface scanning and/or interface scanning of the workpiece.

According to the invention, the optical fibre which interconnects the laser source and the processing head forms a functional component of the scanning device. The optical fibres forms the so-called processing fibre of the laser processing device.

An optical coherence tomograph is a measuring device which, with the assistance of an interferometer, makes use of coherence properties, i.e. the ability of light for interference. For this purpose it is provided to divide light beams emitted by a broad-band light source with the aid of a beam splitting device, in particular with a semi-transmitting mirror, into two beam bundles.

The first beam bundle is guided in a so-called reference arm which has a known adjustable length. The beam bundle is reflected at the end in the reference arm, again guided in the reference arm and then imaged on a detector.

The second beam bundle is guided onto the surface of a workpiece to be measured and there is at least partially reflected again in the direction of the coherence tomograph. The reflected light is also imaged on the detector in the coherence tomograph and there results in interference with the first beam bundle. Information on the length difference between measuring arm and reference arm can be obtained from the measurement signal produced by the detector. From this information on the surface and/or the interface of the workpiece and from this in turn the surface, edges, keyhole depth, processing error etc. can be determined.

Height differences along a measuring beam axis in the micrometre range can be detected by an optical coherence tomograph. Three-dimensional profiles of surfaces can be created by a scanning movement, i.e. a deflection of the measuring beam and the reflection beams in one or more spatial directions. In this case, it is ensured that the measuring beam runs coaxially to the processing beam which facilitates a measurement.

For example, a workpiece to be processed can be measured before the processing. Optionally an adaptation of a processing position of the laser processing device or the processing head to component tolerances can then be made. It is furthermore possible to measure the depth of penetration depth of the processing beam into the component during the processing. This dimension is particularly of interest for so-called overlap welds in order to be able to detect defects between the two overlapping workpieces. After carrying out the processing, the three-dimensional geometry of the weld seam can be detected and checked by a scanning movement of the measuring beam over a cooled weld seam. Optionally this is even possible before, during and after the processing process.

The detection of the surface and/or the interface can be used for process monitoring, quality assurance and/or regulation of the laser processing device.

The measuring arm of the scanning device configured as an optical coherence tomograph (OCT) can thus according to the invention run at least in sections together with the processing beams in the optical fibre (the so-called processing fibre). This means that during operation of the measuring device at least a part of the optical fibre can be used by the measuring arm of the scanning device.

In one embodiment, the scanning device is integrated in the laser processing device in such a manner that an optical measuring arm provided for the scanning device is guided at least in sections in the optical fibre which interconnects the laser source and the processing head.

This yields the advantage that the measuring device can be disposed, not as in the prior art on the processing head, but at least partially at or in the laser source. As a result, a part of the measuring device does not need to be co-moved and in particular the external interfering contour of the processing head is not changed, in particular not enlarged. A collision with clamping tools or other components of the system is therefore eliminated by the provision of the measuring device.

Another advantage is that the measuring device can be incorporated simply into an existing laser processing device by retrofitting. For this purpose it is merely necessary to couple in the beam bundle of the measuring arm of the scanning device into the optical processing fibre.

The scanning device can comprise a light source, wherein the light source can be disposed in a housing of the laser source or in a fibre coupler of the optical fibre (i.e. the processing fibre), which interconnects two parts of the optical fibre for transmission of the processing beam, and wherein the light delivered by the light source can be coupled-in by means of a first coupling-in device in the housing of the laser source or in the fibre coupler into the optical fibre. The first coupling-in device can, for example, be formed by a beam splitter such as, for example, a dichroic mirror. The coupling-in can be accomplished reflectively or transmissively as desired. Alternatively the measuring beam can also be coupled into a so-called "combiner". This is in particular possible and advantageous in those laser sources in which the processing radiation is generated in a plurality of modules with respective fibre outputs. The individual fibres or fibre outputs in the fibre-based combiner are connected jointly to the processing fibre or the optical fibre. Such a fibre-based combiner can be used to connect the measuring beam provided by the scanning device simply, in particular subsequently, into a corresponding fibre to the optical fibre.

The coupling-in of the measuring beam can be accomplished in the laser source. Likewise it is possible to couple in the measuring beam outside the laser source into a fibre coupler which can be configured as a beam switch, into the optical fibre. The fibre coupler serves to connect the optical fibre provided separately by the laser source and/or the processing head to the laser source and/or the processing head. In this case, the fibre coupler ensures that the processing beam produced by the laser source is coupled into the optical fibre loss-free or unchanged. If the measuring beam in the laser source, i.e. inside the laser housing, should not or cannot be coupled into the beam path of the processing laser, according to this embodiment it is also possible to couple the measuring beam outside the laser source via a fibre coupler into the optical fibre. For this purpose a first coupling-in device (e.g. a semi-transmitting mirror) is provided in the fibre coupler.

The scanning device has a second coupling-in device which comprises a beam splitter, in particular a dichroic mirror or a fibre-based combiner which guides light guided therein in the measuring arm and the reference arm. The second coupling-in devices forms the so-called OCT beam splitter. The second coupling-in device can be assigned to the laser source or the fibre coupler. This means that the beam splitter is arranged in or as a separate component at the laser source or the fibre coupler. In this embodiment the light initially passes through the OCT beam splitter and then the beam splitter of the laser source or the fibre coupler. Alternatively the second coupling-in device can be assigned to the processing head. This means that the beam splitter is arranged in or as a separate component at the processing head. In this embodiment, the light initially passes through the beam splitter of the laser source and then the OCT beam splitter in or on the processing head.

It can also be provided to arrange the scanning device with all the components in or on the laser source. In this embodiment the light passes initially through the OCT beam splitter and then the beam splitter of the laser source or the fibre coupler. Alternatively it can be provided to arrange the scanning device with the exception of the light source in or on the processing head. In this embodiment the light passes initially through the beam splitter of the laser source and then the OCT beam splitter in or on the processing head.

As described initially, a scanning device configured as an optical coherence tomograph has an optical reference path designated as reference arm. According to a further embodiment, the reference arm provided for the scanning device is guided in a further optical fibre. The further optical fibre is a fibre which is independent of the optical fibres, i.e. the processing fibres, which interconnect the laser source and the processing head.

According to a further expedient embodiment, the scanning device, in particular complete with all its components, can be arranged in the laser source. For this purpose the scanning device can be arranged in the housing of the laser source itself or in a separate housing and fastened on the housing of the laser source.

It is furthermore expedient if the length of the reference arm can be automatically adapted to the length of the measuring arm, e.g. by a reflection surface of the reference arm which is displaceable in the beam direction. By this means not only different connection possibilities for the scanning device in the laser processing device can be taken into account but there is also the possibility that the measuring beam can be pivoted in a scanning movement by the processing head in one or several spatial directions. As a result of the pivoting, various spacings are obtained between the emergence of the measuring beam and the impinging upon the workpiece to be processed. This length variation is taken into account by the length variation of the reference arm, thus enabling a reliable measurement.

For example a superluminescence diode having a wavelength between 600 nm and 900 nm can be provided as light source. In particular a light source having a wavelength between 600 nm and 700 nm is provided. As a result a so-called pilot laser which in the laser source is coupled into the processing fibre (optical fibre) for the purposes of alignment of the laser processing device can be replaced by the light source of the scanning device. The wavelengths of typical pilot lasers are in the range between 600 nm and 700 nm. If, as proposed, the wavelength of the scanning device is selected to be similar to that of the pilot laser, the pilot laser function can still be maintained. Alternatively the light source can be provided with a wavelength between 800 nm and 900 nm. By this means a measurement can be made independently of the wavelength range of the pilot laser.

In a further embodiment it can be provided that the optical fibre is a monomode fibre.

According to a further aspect of the present invention, a laser processing device is provided which comprises a laser source and a processing head which is configured to provide at least one high-energy processing beam, in particular a laser beam, wherein the laser source and the processing head are interconnected by an optical fibre. Furthermore a measuring device is provided which comprises a scanning device configured as an optical coherence tomograph for surface scanning and/or interface scanning of a workpiece. The laser processing device comprises a measuring device of the type described above.

Figure 2:
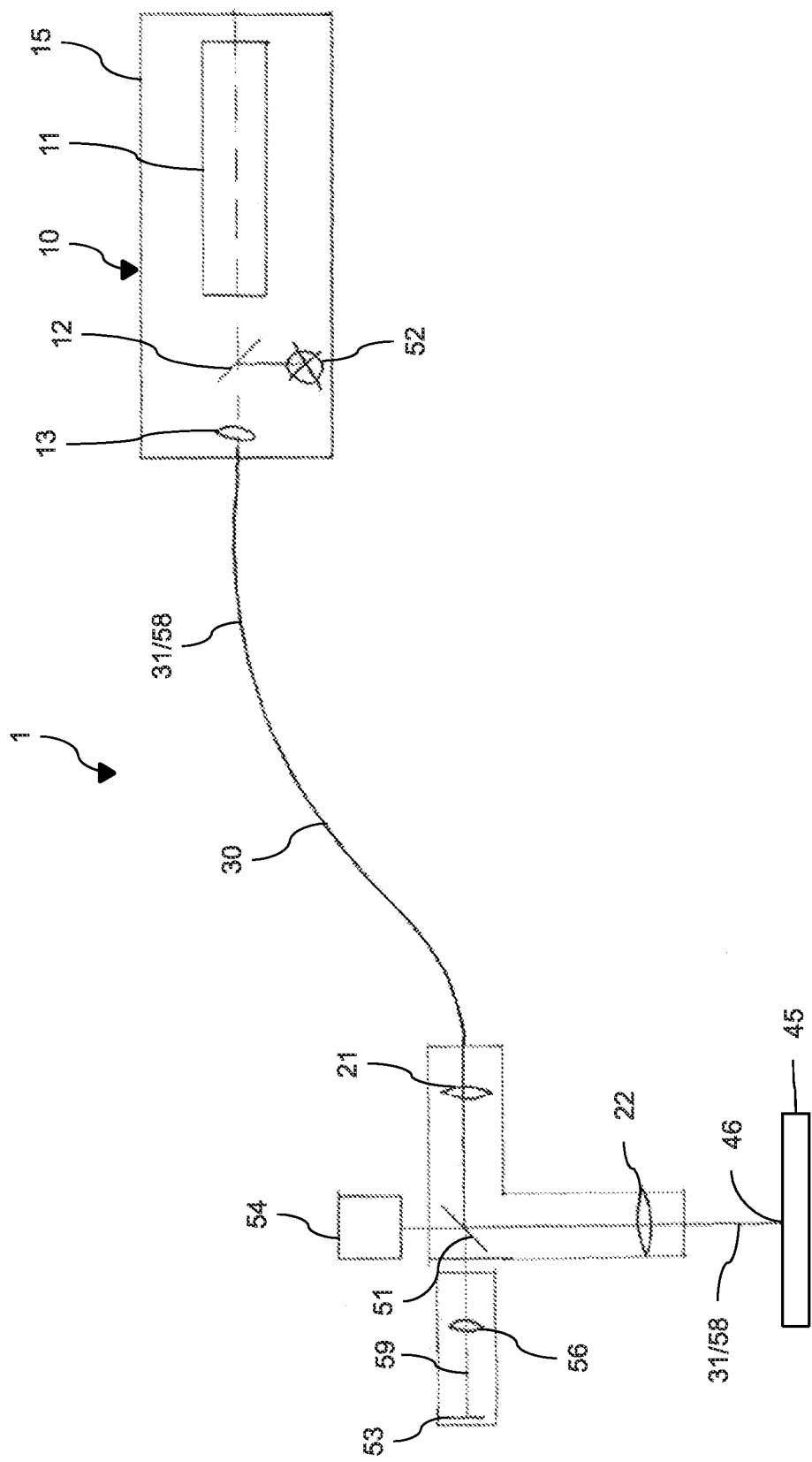

The invention is explained hereinafter in detail with reference to exemplary embodiments in the drawings. In the figures:

FIG. 1 shows a first exemplary embodiment of a laser processing device with a measuring device according to the invention and FIG. 2 shows a second exemplary embodiment of a laser processing device with a measuring device according to the invention.

FIG. 1 shows a laser processing device 1 which substantially consists of a laser source 10 as well as a processing head 20 carried by a guide machine 40. The guide machine 40 is for example a buckling arm robot or a portal system which can bring the processing head 20 into various spatial positions relative to a, for example, workpiece 45 located underneath the processing head 20 in order to ensure processing of the workpiece 45 at a predefined processing position 46. For the provided processing process of the workpiece 45, for example the workpiece 45 can be displaced whilst the processing head 20 is held with the aid of the guide machine 40 in a substantially constant and in a substantially perpendicular position with respect to the workpiece. Alternatively a movement of the processing head 20 can also be made with the aid of the guide machine 40 with simultaneously static workpiece 45.

The laser source 10, which is also designated as processing laser, is connected by means of a flexible optical fibre 30, for example, a glass fibre line, to the processing head 20. In this case, the laser light produced by a cavity 11 of the laser source 10 is coupled into the optical fibre 30 via an optical system provided in the laser source 10. The optical fibre 30 is designated as processing fibre in this description. Starting from the laser source, the laser light is directed as a high-energy processing beam 31 through the processing fibre 30 and an optical system of the processing head 20 onto the workpiece 45.

The laser source is assigned a measuring device which comprises a scanning device 50 configured as an optical coherence tomograph for a surface scanning of the workpiece. The scanning device 50 can be integrated partially or completely in a housing 15 of the laser source 10. The scanning device 50 can, if this is not completely integrated in the housing, be provided on the laser source 10 outside the housing 15 thereof. The scanning device 50 is provided for a determination of a surface structure produced by a processing process, e.g. a welding process, in the region of the processing position 46 (e.g. a joining gap and/or a weld seam).

The scanning device 50 substantially comprises a light source 52, an OCT beam splitter 51, a reflector 53 and a detector 54 which is advantageously configured as a spectrometer. The light source 52 is a superluminescence diode which is electrically connected to a control circuit not shown in detail and which emits light having a wavelength in the range between 600 nm to 900 nm, in particular between 600 nm to 700 nm or between 800 nm to 900 nm, in the direction of the beam splitter 51. The OCT beam splitter 51, which for example is configured as a semi-transmitting (dichroic) mirror, transmits the light emitted by the superluminescence diode 52 partially as a reference beam into the reference arm 59. Another portion of the light delivered by the superluminescence diode 52 is reflected at the beam splitter 51 in the direction of a beam splitter 12 of the laser source 10 and from this is coupled into the processing fibre 30 via the optical system of the laser source 10. This portion of the light delivered by the superluminescence diode 52 forms the measuring beam in a so-called measuring arm 58 and is guided in the direction of the workpiece 45.

The reference arm 59 is formed by an optical fibre provided in the scanning device 50 which is configured at least partially as a winding. For example, the wound portion of the optical fibre can be attached to a winding core not shown in detail which, for example, can be enlarged in its diameter by applying an electrical voltage in order to thereby bring about an elongation of the winding of the optical fibre of the reference arm 49. By this means a length variation of the reference arm, which is symbolized by the arrow designated with 55 in FIG. 1, can be brought about. The length variation changes the transit time of the light from the superluminescence diode 52 coupled into the reference arm 59.

The portion of the light delivered by the superluminescence diode 52 introduced into the measuring arm 58 is deflected by a collimating lens 57 arranged merely as an example inside the housing 15 of the laser source 10 onto the semi-transmitting mirror 12. The semi-transmitting mirror 12 is transparent for the light of the processing beam 31 delivered by the laser source 11. The portion of the light delivered by the superluminescence diode 52 guided via the collimating lens 57 onto the semi-transmitting mirror 12 is completely deflected and coupled into the processing fibre 30 together with the processing beam 31 via the optical system of the laser source in the form of a coupling-in lens 13.

After passing through the optical fibres, the processing beam 31 and the measuring beam are jointly incident in a collimating lens 21 of the processing head 20 which is displaceable along the direction of movement characterized by 25 and are guided by a deflecting mirror 23 through a focusing lens 22 onto a scanner mirror 24 which is pivotable in the spatial direction so that the processing beam 31 and the measuring beam in the measuring arm 58 jointly impinge upon the processing position 46 of the workpiece 45. The scanner mirror 24 is pivotable in one or two axes in the direction of the arrow 26.

At the processing position 46 of the workpiece 45, the measuring beam is reflected and is guided via the optical system (comprising the collimating lens 21, the focusing lens 22, the deflecting mirror 23 and the scanner mirror 24) of the optical system 20 through the optical fibre 30 back in the direction of the laser source 10. At the same time, the measuring beam is deflected by the optical system (comprising the mirror 12, the coupling-in lens 13 and the focusing lens 57) of the laser source 10 in the direction of the scanning device 15 in order to then be deflected by the beam splitter 51 in the direction of the detector 54. Accordingly light reflected by the reflector mirror 53 in the reference arm 59 is deflected by the beam splitter 51 into the detector 54.

As a result of interaction of the light coupled into the reference arm 59 with the reflection beam reflected back from the workpiece 45, interference of the two light beams takes place, i.e. a superposition of the light waves, behind the beam conductor 51. The incident light intensity can be determined by the detector 54 as a function of the wavelength, which is connected to an evaluation circuit not shown in detail. Knowing the respectively instantaneously present length of the reference arm 59 and the wavelength-dependent light intensity present at the detector, it is possible to determine the distance between the optical coherence tomograph (i.e. the scanning device 50) and the surface of the workpiece 45 so that with suitable guidance of the measuring beam 58, a profile of the surface of the workpiece 45 or the depth of penetration of the processing laser in the workpiece can be determined.

The coupling-in of the measuring beam inside the laser source 10 shown in FIG. 1 is used in many laser processing devices 10 in order to couple in so-called red pilot lasers for alignment purposes. Instead of using a pilot laser in known existing laser processing devices 1, the measuring beam of the measuring device can be coupled into the processing fibre (optical fibre). The retrofitting of the measuring device is therefore very easily possible. If in one embodiment the illumination wavelength of the light delivered by the superluminescence diode 52 is selected to be similar to the wavelength of a red pilot laser (whose wavelength is typically in the range between 600 nm and 700 nm), the function of the pilot laser for alignment purposes can be retained. Alternatively it is possible to couple the pilot laser via a semi-transmitting mirror and the measuring beam via a semi-transmitting mirror additionally arranged in the beam path of the laser source into the optical fibre 30. In this case, the proposed measuring device preferably uses a wavelength range between 800 nm and 900 nm.

As was apparent from the preceding description, in the present exemplary embodiment of FIG. 1 the measuring beam passes completely through the optical fibre 30 which interconnects the laser source 10 and the processing head 20. An advantage of this procedure is that the measuring device can be simply integrated into existing laser processing devices 1. In order to integrate the measuring device 50 into an existing laser processing device 1, it is merely necessary to couple the measuring arm in the region of the laser source into the processing beam 31, which in the present case is achieved with the aid of the collimating lens 57 and the semi-transmitting mirror 12.

In an alternative embodiment not shown, the coupling-in of the measuring arm could also be accomplished in the region of a so-called fibre coupler. A fibre coupler interconnects two parts of the optical fibre 30. The fibre coupler is used, for example, to couple the optical fibre 30 at a specific position on an optical fibre section of the laser source 10. Thus, the measuring arm then runs only through a subsection of the optical fibre 30.

A feature of the present invention is therefore that the high-energy processing beam 31 and the measuring beam of the measuring arm 58 are arranged coaxially to one another and run at least partially together in the optical fibre 30 which interconnects the laser source 10 and the processing head 20.

The measuring beam in the measuring arm 58 and the high-energy processing beam 31 can be deflected with the aid of the pivotable scanner mirror 24 in one or more directions in order to enable a flat scanning or processing of the surface of the workpiece 45. In order to hereby take into account a length variation produced in the measuring arm 58, an automatic adaptation of the length in the reference arm 59 takes place in the manner described above. This structure can be used to determine the processing position at the processing site 46 of the workpiece 45 before making a welded joint. During the processing the depth of penetration of the processing laser can be measured, monitored and regulated. Following a welding that has been made, the weld seam produced can then be scanned by a pivoting of the scanner mirror 24 and thus examined for surface defects.

FIG. 2 shows a second exemplary embodiment of a laser processing device 1. In the exemplary embodiment shown in FIG. 2, existing components of a laser processing device are used by the scanning device 50. In this exemplary embodiment, only the superluminescence diode 52 is provided in the laser source 10. The light delivered by the superluminescence diode 52 is coupled into the optical fibre 30 via the semi-transmitting mirror 12 already described and the coupling-in lens 13. The processing head 20 has integrated dichroic beam splitter mirrors for coupling out measuring and camera beams. The beam splitter 51 already provided, which can now be considered to be part of the scanning device 50, is used for the scanning device and the measuring process. In this case, according to FIG. 2, the detector 54 and the reference arm 59 are arranged on surfaces of the beam splitter 51 facing away from the processing beam 31. The configuration of the reference arm can be accomplished in the manner described above. The advantage compared with the complete integration of the scanning device in the laser source 10 is the shorter reference arm 59. In addition, no length variations in the measuring arm 58 of the scanning device 50 occur due to movement of the processing fibres 30.

REFERENCE LIST

1 Laser processing device
10 Laser source
11 Cavity
12 Beam splitter
13 Coupling-in lens
15 Housing of laser source
20 Processing head
21 Collimating lens
22 Focusing lens
23 Deflecting mirror
24 Scanner mirror
25 Direction of movement of collimating lens 21
26 Pivoting direction of scanner mirror
30 Optical fibre (processing fibre)
31 Processing beam/path
40 Guide machine
45 Workpiece
46 Processing position
50 Scanning device
51 OCT beam splitter (e.g. dichroic mirror)
52 Light source
53 Reflector
54 Sensor (spectrometer)
55 Variation of length in a reference arm
56 Focusing lens
57 Collimating lens
58 Measuring arm
59 Reference arm

The invention claimed is:

1. A measuring device for acquiring surface data and/or interfaces of a workpiece to be processed by a laser processing device, wherein the laser processing device comprises a laser source and a processing head which is configured to provide at least one high-energy processing beam, and wherein the laser source and the processing head are interconnected by an optical fibre and wherein the measuring device comprises a scanning device configured as an optical coherence tomograph for surface scanning and/or interface scanning of the workpiece,
    characterized in that the optical fibre which interconnects the laser source and the processing head forms a component of the scanning device,
    wherein the scanning device comprises a light source different from the laser source disposed in a housing of the laser source or in a fibre coupler of the optical fibre, which interconnects two parts of the optical fibre for transmission of the processing beam, and
    wherein the light delivered by the light source is coupled into the optical fibre by means of a first coupling-in device in the housing of the laser source or in the fibre coupling.

2. The measuring device according to claim 1, characterized in that the scanning device is integrated in the laser processing device in such a manner that an optical measuring arm provided for the scanning device is guided at least in sections in the optical fibre which interconnects the laser source and the processing head.

3. The measuring device according to claim 1, wherein the first coupling-in device is a beam splitter.

4. The measuring device according to claim 1, characterized in that a second coupling-in device of the scanning device comprises a beam splitter, which guides light guided therein into a measuring arm and a reference arm.

5. The measuring device according to claim 4, characterized in that the second coupling-in device is assigned to the laser source or the fibre coupler or the processing head.

6. The measuring device according to claim 4, characterized in that the length of the reference arm can be automatically adapted to the length of the measuring arm by a reflection surface of the reference arm which is displaceable in the beam direction.

7. The measurement device of claim 4, wherein the second coupling-in device of the scanning device is a dichroic mirror or a fibre-based combiner.

8. The measuring device according to claim 1, characterized in that the scanning device is disposed in the laser source or the fibre coupler.

9. The measuring device according to claim 1, characterized in that the scanning device with the exception of the light source is disposed in the processing head.

10. The measuring device according to claim 1, characterized in that an optical reference arm provided for the scanning device is guided in a further optical fibre.

11. The measuring device according to claim 1, characterized in that the light source has a wavelength between 600 nm and 900 nm.

12. The measurement device of claim 11, wherein the wavelength is between 600 nm and 700 nm.

13. The measurement device of claim 11, wherein the wavelength is between 800 nm and 900 nm.

14. The measuring device according to claim 1, characterized in that the optical fibre is a monomode fibre.

15. A laser processing device comprising a laser source and a processing head which is configured to provide at least one high-energy processing beam, wherein the laser source and the processing head are interconnected by an optical fibre, and wherein a measuring device is provided which comprises a scanning device configured as an optical coherence tomograph for surface scanning and/or interface scanning of a workpiece,
    characterized in that the measuring device is configured according to claim 1.

16. The measuring device of claim 1, wherein the at least one high-energy processing beam is a laser beam.

17. The measurement device of claim 1, wherein the light source is a superluminescence diode.

* * * * *